Jan. 21, 1969           P. MOULIN           3,422,783
DEVICE FOR AUTOMATICALLY POSITIONING A FLOATING INSTALLATION
BY MEANS OF MOORINGS WITH CONTROLLED TENSION
Filed Feb. 9, 1967           Sheet 1 of 4

INVENTOR
PIERRE MOULIN

BY    *I. William Miller*

ATTORNEY

INVENTOR
PIERRE MOULIN
BY
ATTORNEY 3,422,783
DEVICE FOR AUTOMATICALLY POSITIONING
A FLOATING INSTALLATION BY MEANS OF
MOORINGS WITH CONTROLLED TENSION
Pierre Moulin, Montesson, France, assignor to Institut
Francais du Petrole, des Carburants, et Lubrifiants,
Rueil-Malmaison, Hauts-de-Seine, France
Filed Feb. 9, 1967, Ser. No. 614,970
Claims priority, application France, Feb. 9, 1966, 49,052
U.S. Cl. 114—144               6 Claims
Int. Cl. B63b *21/16;* B63h *15/00*

ABSTRACT OF THE DISCLOSURE

This device comprises a plurality of moorings provided with means for fixing the moorings to the water bottom and a plurality of winches fixed to the installation, on which the moorings are respectively wound, these winches being of a type provided with means for regulating the tensions of the moorings.

Figure 1:
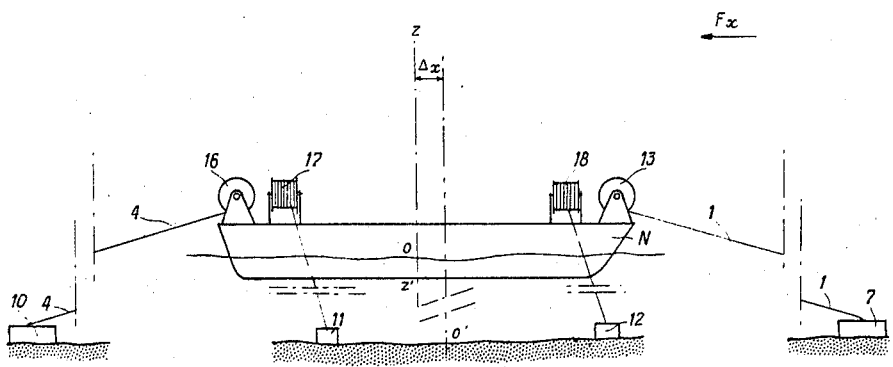

The device is distinguished by the association of means for measuring the drift of the installation from a reference position in the form of deviation signals, means for generating control signals responsive to said deviation signals and means for controlling the regulating means actuated by the control signals so as to limit the drift of the installation.

---

This invention relates to a new device for anchoring a floating installation such as, for example, a platform or a ship adapted for offshore drilling operations.

A first object of the invention is to automatically keep the position of a floating installation either in a precise location or within a limited area in spite of the external forces, due to the action of swells, winds, currents and tides, tending to move this installation.

Another object of the invention is to provide an automatic positioning device using moorings which is applicable for positioning a floating installation with substantially the same accuracy, even when the swell has a large amplitude, without any risk of breaking the moorings.

Among the means which have been heretofore proposed for the precise offshore positioning of a floating installation particularly a platform or a vessel used for offshore drilling, is the utilization of a plurality of anchors fixed to the water bottom around the installation and connected to the latter through moorings (chains and/or ropes or cables) put under strong tension at the beginning of the anchoring period.

The upper end of these moorings is fixed to the floating installation, for example by winding on a winch which is used to put the mooring rope under tension and locked when the desired tension is obtained (thus the rope cannot come unwound).

The anchors may eventually be replaced by heavy mooring masses laying on the sea bed.

With such a mooring system, the precision of anchoring on one hand and the ability of the system to withstand, without any risk of breaking, high over-tension of the ropes, due for example to the action of the swell, on the other hand, are two goals which are hardly consistent with each other.

In fact, to achieve the second of these goals one must accept either a considerable oversizing of the mooring equipment (anchors, moorings and winches) so that it is able to withstand without breaking considerable forces, or a complication of the mooring system by the use of supplementary moorings, mooring masses or anchors and/or caissons with positive buoyancy connected to both the floating installation and the anchors or mooring masses. If less accuracy in the positioning can be accepted, taut mooring ropes can be used, the elasticity of which is sufficient to allow the displacement of the floating installation in response to the action of the swell, or, alternatively, the length of the mooring ropes can be adjusted when necesary. None of these prior solutions is satisfactory, neither from a standpoint of economy nor from the standpoint of the efficiency and safety of the anchoring system.

Another drawback of these systems results from the fact that the system constituted by the ship and its moorings connected to fixed points of the sea-bottom is an oscillatory system, since the return forces applied to the ship by the moorings are substantially proportional to the amplitude of drift of the ship, and the position of equilibrium of this system varies in accordance with the variations in intensity and direction of the external forces, with a damping coefficient which may be small and a period of oscillation which may be near the period of some alternative external forces (due for example to the swell) acting on the installation.

This results in some risks of resonance with alternative displacement of the ship, such displacement having an increasing amplitude which can lead to breaking of the moorings, the consequences of this breaking being serious, particularly during drilling operations.

The present invention provides an anchoring device which does not present the aforementioned disadvantage and allows to substantially maintain a floating installation in a chosen reference position. It comprises a plurality of moorings or mooring ropes provided with means to fix the lower ends of the ropes to the water bottom, a plurality of winches integral with the floating installation, on which are respectively wound the mooring ropes to be kept under tension by the winches, and means for controlling the respective tension applied by said winches on the mooring ropes.

This device is characterized by the association of means for measuring the deviation of the installation with respect to a chosen reference position in the form of deviation signals, means for generating control signals in response to said deviation signals and means for controlling the tension of the mooring ropes responsive to said control signals so as to limit said deviation.

In this device each winch may be associated with at least another opposed winch applying to the floating installation through the mooring rope which it keeps under tension an action opposing the action of the first winch, one and the same control signal being applied to the control means of associated winches, said control means being adapted to associate to said control signal opposite variations in the tensions of the mooring ropes wound on said associated opposed winches.

In a preferred form of embodiment of the device according to the invention, the means for generating control signals will comprise means comparing the deviation signals and corresponding reference signals having preselected adjustable values, representative of the limit deviation allowable for the installation with respect to its reference position, said last means being adapted to exclusively generate a signal when the difference between the respective absolute values of the deviation signal and the corresponding reference signal is positive, and means for associating a control signal to each signal generated by said comparating means.

Figure 2:
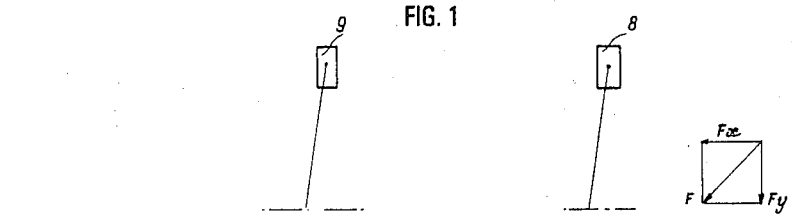
Figure 2:
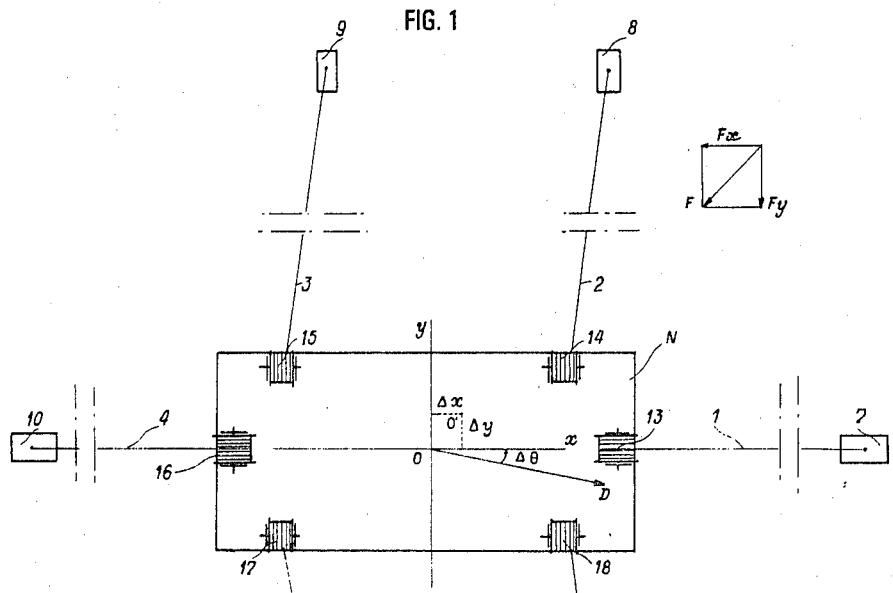
Figure 3:
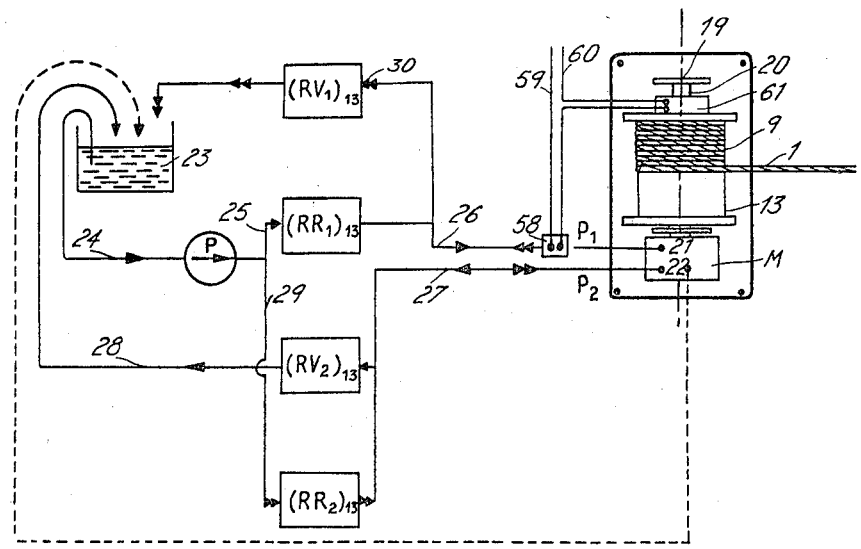
Figure 5:
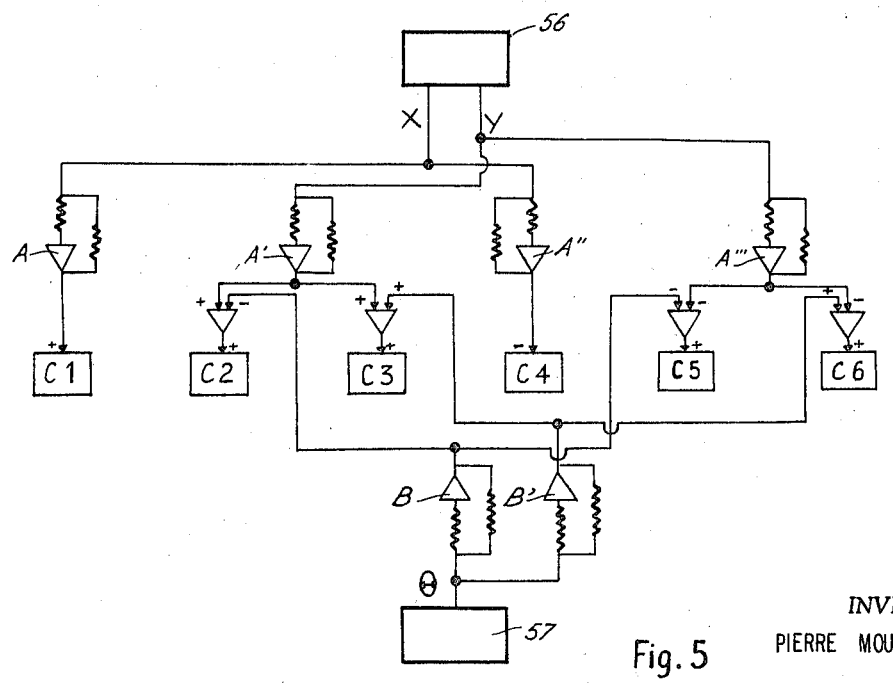
Figure 4:
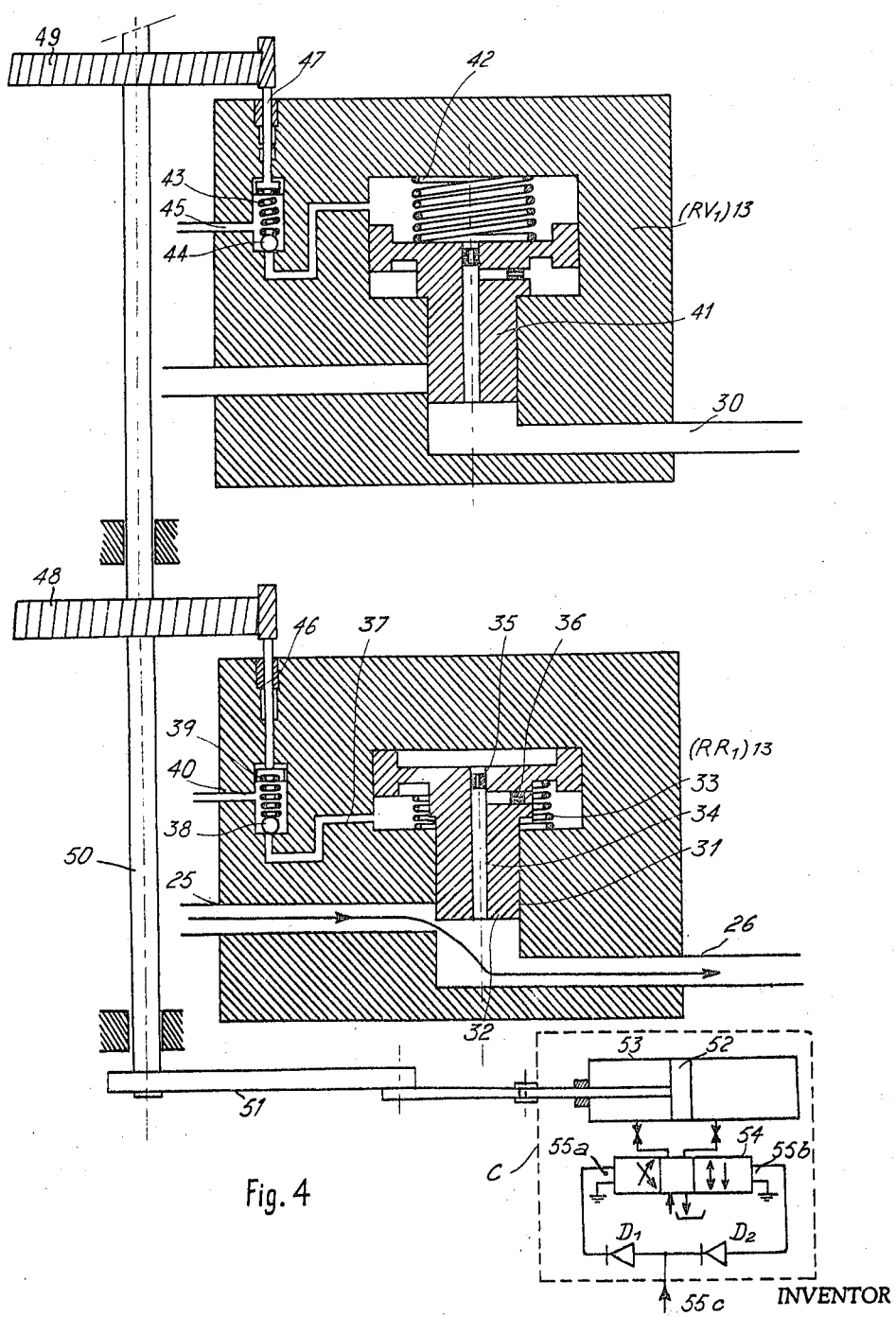
Figure 6:
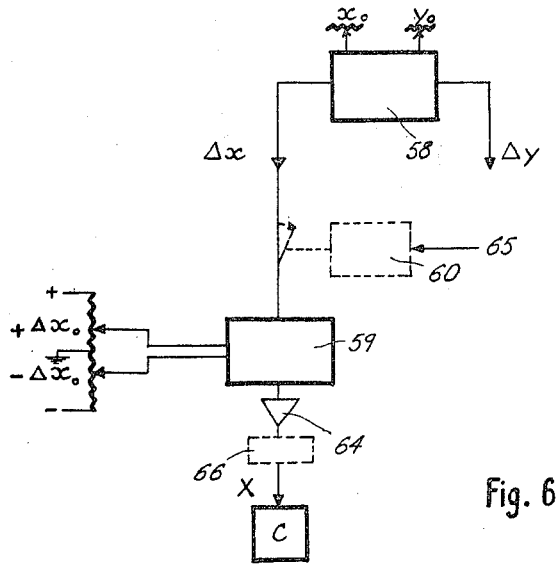
Figure 7:
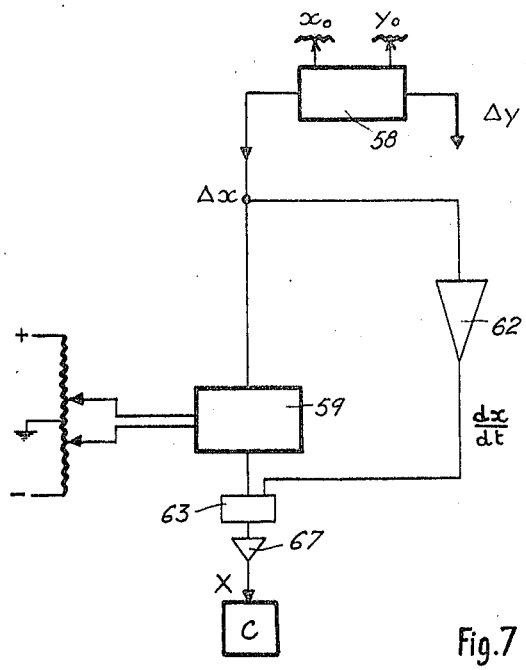

The device according to the invention will be hereinafter illustrated, by way of example only, by some forms of embodiments, with reference to the attached drawings in which:

FIGURE 1 shows schematically a floating installation kept in position through a plurality of moorings wound on mooring winches, FIGURE 2 is a top view of the same installation, FIGURE 3 schematically illustrates a type of hydraulic winch which can be used in the device according to the invention, FIGURE 4 shows an embodiment of the means for regulating the tension of the rope wound on said winch and shows an example of control means cooperating with said regulating means, FIGURE 5 illustrates diagrammatically a form of embodiment of the positioning device according to the invention, FIGURE 6 shows an embodiment of the means for generating control signals for this device, FIGURE 7 relates to another form of embodiment of the means for generating control signals.

FIGURES 1 and 2 schematically illustrate a form of embodiment of a device for positioning a floating installation N.

$xOy$ designates a system of rectangular coordinate axes attached to the floating installation, O being for example the gravity center of N and $Ox$ its longitudinal axis.

$Z'Z$ designates a vertical axis passing through O.

In this form of embodiment six moorings or mooring ropes indicated by numerals 1, 2, 3, 4, 5 and 6 are used, this number of moorings having however no limiting character.

These moorings are at their lower ends fixed to anchors or heavy mooring masses 7, 8, 9, 10, 11 and 12 respectively.

Each mooring rope is, at its upper end, wound on a winch of a type exerting a controllable tension on the mooring rope (winches 13, 14, 15, 16, 17 and 18 respectively).

In the illustrated embodiment four moorings are stretched along a direction substantially parallel to the athwart axis $Oy$ of N, and only two along the longitudinal axis $Ox$ of the installation, so as to take into account the fact that a ship is more susceptible to external forces (due to winds, currents, etc.) tending to move it, when these forces have an athwartship direction.

The winches 14, 15, 17 and 18 will preferably be remote from the centre of gravity O, in order that the tensions they exert on their respective moorings better prevent the rotation of N on itself.

A form of embodiment of a known type of winch exerting a controllable tension on the mooring rope wound thereon is diagrammatically shown, for example, by FIGURE 3, as seen from above.

This winch (winch 13 for example) is supported by a bedplate 19 and its shaft 20 is coupled to a hydraulic motor M.

This motor has two apertures 21 and 22, the former used for admission into M of oil coming from a tank 23 and the latter for the exhaust of this oil which returns to the tank.

The outlet pipe of the motor M has been indicated in dotted line.

This motor is reversible, i.e., when the pressure $P_1$ of the oil in the hydraulic circuit at the aperture 21 is higher than the pressure at aperture 22, the winch is driven by M in the direction corresponding to the winding up of the mooring rope 1, the oil then being admitted into M through the aperture 21 and evacuated through the aperture 22 (M working as a motor); on the contrary if, by a pull on the mooring rope 1 which is sufficient to unreel said rope, the winch 13 is rotated in the opposite direction, M works as a pump admitting oil through the aperture 22 and delivering this oil at a higher pressure through the aperture 21.

The classical hydraulic circuit of the winch, schematically illustrated by FIGURE 3, allows this reversibility.

It comprises two sorts of known valves:

(1) Pressure reducing valves (indicated by $(RR_1)_{13}$ and $(RR_2)_{13}$ on FIG. 3) the effect of which is to maintain a substantially constant pressure $(PRR_1)_{13}$ and $(PRR_2)_{13}$, respectively, downstream from their location on a flow of hydraulic fluid, irrespective of the variations in flow rate.

(2) Safety valves (indicated by $(RV_1)_{13}$ and $(RV_2)_{13}$ on FIG. 3) which allow the hydraulic fluid to flow only when its pressure becomes higher than a calibrating pressure $(PRV_1)_{13}$ and $(PRV_2)_{13}$, respectively, and which maintain in the flow of hydraulic fluid, upstream from their locations thereon, substantially constant pressures, equal to their respective calibrating pressures.

The operation of these devices will be indicated hereinafter with reference to FIG. 4 so as to permit a better understanding of the forms of embodiments which will be described in the following by way of illustration of the invention.

The hydraulic circuit of the winch comprises a motor-pump set drawing in oil fed from the tank 23 at a slight pressure through the pipe 24 and delivering it at a higher pressure.

When M works as a motor (thereby winding up the mooring rope 1 on the winch 13), the oil under pressure escaping from P flows (along the path indicated by simple arrows on the figure) through the pipes 25 and 26 successively to the aperture 21 where it is admitted into M wherefrom this oil escapes through the outlet aperture 22 and flows through the pipes 27 and 28 successively until it returns into the tank 23.

On the pipe 25 is placed the pressure-reducing valve $(RR_1)_{13}$ which maintains in the pipe 26, downstream from its location, a constant pressure $(PRR_1)_{13}$ defining the inlet pressure of the oil into M, irrespective of the variations in the flow rate of oil supplied by the pump P ($(RR_1)_{13}$ is provided with means for regulating said pressure $(PRR_1)_{13}$.

On the pipe 28 for return to the tank 23 is placed a safety valve (indicated by $(RV_2)_{13}$), which maintains in the pipe 27, upstream from its location, a constant pressure $(PRV_2)_{13}$ equal to the pressure $P_2$ at which the oil escapes from the aperture 22 of ($(RV_2)_{13}$ is provided with means for regulating this pressure).

The following inequality is necessary:

(1) $\quad (PRV_2)_{13} < (PRR_1)_{13}$

The tension exerted on the mooring rope 1 during its winding up is substantially proportional to the difference:

$$P_1 - P_2 = (PRR_1)_{13} - (PRV_2)_{13}$$

and has therefore within the limits of the oil flow rate designed for the hydraulic circuit a substantially constant value $T_{E_1}$ complying with the relation:

(2) $\quad T_{E_1} = k\alpha[(PRR_1)_{13} - (PRV_2)_{13}]$ where $k$ is a coefficient of proportionality $\alpha$ the mechanical efficiency of the motor M ($\alpha < 1$)

When M is working as a pump, which corresponds to the unwinding of the mooring rope 1 as a result of a sufficient pull or traction applied thereto, the oil escaping from the pump P flows (along the path indicated by double arrows) through the pipes 29 and 27 successively until the aperture 22 where the oil is admitted into M.

The oil is delivered through the aperture 21 at a pressure higher than its inlet pressure at 22 and flows through the pipes 26 and 30 successively until it returns into the tank 23.

Another pressure-reducing valve indicated by $(RR_2)_{13}$ has been placed on the pipe 29 so as to maintain a constant pressure $(PRR_2)_{13}$ of the oil at the admission thereof into M through the aperture 22 ($(RR_2)_{13}$ is provided with means for regulating this pressure).

On the pipe 30 for return to the tank 23 is located a safety valve $(RV_1)_{13}$ which maintains, upstream from its location on the pipe 30, a constant pressure $(PRV_1)_{13}$ at the outlet aperture 21 of $((RV_1)_{13}$ is also provided with means for regulating this pressure).

In order to allow M to work as a pump as a result of the unwinding of the mooring rope 1 under a sufficient pull applied thereto, the following inequality must be satisfied:

(3) $\qquad (PRV_1)_{13} > (PRR_2)_{13}$

The pull exerted on the mooring rope 1 during the unwinding thereof is proportional to the difference $$PRV_1 - PRR_2$$

and has therefore a constant value:

(4) $\qquad T_{D_1} = k\alpha[(PRV_1)_{13} - (PRR_2)_{13}]$ $k$ and $\alpha$ having the already indicated respective meanings ($\alpha < 1$).

For a correct operation of the hydraulic circuit, the following supplemental inequalities must also be satisfied:

(5) $\qquad (PRV_1)_{13} > (PRR_1)_{13}$
(6) $\qquad (PRV_2)_{13} > (PRR_2)_{13}$ to prevent the oil, flowing from the valves $(RR_1)_{13}$ and $(RR_2)_{13}$, to flowing back from the tank 23 directly through the respective pipes 30 and 28, without flowing through the motor-pump M.

The inequalities (5) and (6), taken in connection with the inequality (2), give (7) $\qquad (PRR_2)_{13} < (PRV_2)_{13} < (PRR_1)_{13} < (PRV_1)_{13}$ Under these conditions it appears immediately, by considering the relation (2) and (4), that the constant tension $T_E$ exerted by the winch 13 on the mooring rope 1 during the winding-up of this rope is smaller than the constant tension $T_D$ exerted by this winch on the rope 1 during its unwinding $$T_E < T_D$$

The winches 14, 15, 16, 17, 18 are identical to the winch 13.

The pressure reducing valves and the safety valves of these winches will be hereinafter referred to by notations which are similar to those designating the corresponding valves of the winch 13 with indication by an index of the winch to which they correspond, for example $(RR_1)_{14}$, $(RV_2)_{18}$ ... etc.

The tension of the moorings during their winding and unwinding will be respectively indicated by $T_E$ and $T_D$ with the index 1 to 6, according to the mooring rope to which this tension is applied.

The pressure reducing valve $(RR_1)_{13}$, schematically illustrated in FIGURE 4, comprises a cylinder 31, the internal wall of which receives the pipe 25 admitting fluid under pressure from the pump P. This fluid flows through pipe 26, the piston 32 being normally kept in its upper position by the spring 33 and uncovering the aperture through which the pipe 25 opens near the bottom of the cylinder 31.

The static pressure at the bottom of this cylinder is established on both sides of the piston 32 through the bore 34 of the piston 32 and the calibrated aperatures 35 and 36.

This pressure is applied through the duct 37 to the valve 36 which is kept in the position for closure of the duct 37 by means of the spring 39.

When, as a result of an increase of pressure in the pipe 26, the pressure applied to the valve 38 becomes greater than the calibrating pressure $(PRR_1)_{13}$ of the spring 39, the valve 38 is lifted and fluid escapes to the tank 23 (the drain pipe 40 has not been shown on FIG. 3 in order not to complicate the drawing).

It results therefrom that the piston 32 comes out of balance and is lowered, thereby reducing the cross section for passage of the fluid through the pipe 25 at the bottom of the cylinder 31 and thus lowering the pressure back to the valve $(PRR_1)_{13}$.

The operation of the safety valve $(RV_1)_{13}$ shown by FIG. 4 is as follows: under the action of the spring 42 the piston 41 normally tends to close any communication between the inlet and outlet pipes of this valve.

However, when the pressure in the pipe 30 becomes higher than the calibrating pressure $(PRV_1)_{13}$ of the spring 43 which holds the valve 44 in its closed position, this valve is raised, thereby allowing fluid to escape to the tank 23 through the drain pipe 45 (not shown on FIG. 3).

The piston 41 is then raised and the fluid can flow until the pressure in the pipe 30 is established at the valve $(PRV_1)_{13}$.

With reference to FIGS. 1 and 2, it is first assumed that the floating installation N occupies the desired position, for example that its center of gravity is in plumb with a fixed reference point O' of the water bottom, and further that no perturbation (due to winds, currents . . .) tends to move N away from this position.

The moorings 1, 2, 3, 4, 5 and 6 are then put under tension by winding them up on the respective winches 13, 14, 15, 16, 17 and 18, with respective values of their tensions equal to $T_{E_1}$, $T_{E_2}$, $T_{E_3}$, $T_{E_4}$, $T_{E_5}$, $T_{E_6}$, so as to keep the installation N in the chosen position.

Assuming now that the horizontal component F of the resultant of the external forces acting on N (and essentially due to the action of winds and currents) has the direction indicated on FIGURE 2, this force F tends to move N toward the left side of FIG. 2, thereby increasing the tension on the mooring rope 1 from its initial value $T_{E_1}$.

As long as the amplitude of the displacement or drift of N is small enough so that the tension of the mooring rope 1 does not reach the tension $T_{D_1}$ for unwinding this rope which tension is a function of the difference:

$$(PRV_1)_{13} - (PRR_2)_{13}$$

the increase in tension of this rope will be absorbed by the elasticity thereof and/or by a change in its profile of equilibrium (in the case where this rope has an apparent weight in water which is different from zero).

When the tension on the mooring rope 1 reaches the value $T_{D_1}$, the rope 1 unwinds with a constant tension $T_{D_1}$ and the rope 4 is wound up on the winch 16 with the constant tension $T_{E_4}$.

Therefrom will result a resisting force:

$$T_{D_1} - T_{E_4}$$

having a direction opposite to the component $Fx$ of F along the axis $Ox$ (assuming for simplification that the heavy mooring masses 7, 8, 9, 10, 11 and 12 have been immersed at a distance of O' which is sufficient for considering the moorings as substantially horizontal, which however does not constitute any limitation for the device according to the invention).

The device according to the invention comprises measuring means which may be of any known suitable type for translating into a deviation signal the distance $\Delta x$ between O and the reference position (in plumb with O') and is adapted to automatically cause, in response to said deviation signal, at least when this signal becomes higher than a fixed minimum value, an increase in the tension $T_{D_1}$ applied by the winch 13 to the rope 1 when unwinding the same, this increase being produced by increasing the difference between the calibrating pressures $(PRV_1)_{13}$ and $(PRR_2)_{13}$.

Alternatively or in addition to the above indicated action, the device of the invention will be adapted to automatically cause a decrease in the tension $T_{E_4}$ at which the mooring rope 4 is unwound from the winch 16, by decreasing the difference between the calibrating pressures $(PRR_1)_{16}$ and $(PRV_2)_{16}$.

The increase thus obtained in the resisting force proportional to $$T_{D_1} - T_{E_4}$$

will first balance $Fx$, thus stopping the drift of the point O toward the left of the point O'.

The direction of movement of N must then be reversed so as to move O to the right toward O' or any other chosen position, by increasing the difference $$(PRR_1)_{13} - (PRV_2)_{13}$$

which defines the tension for winding, at least up to a value equal to that reached by the difference $$(PRV_1)_{13} - (PRR_2)_{13}$$

when the drift of the installation has been stopped.

This implies, taking into account the relation (7), that the difference $(PRV_1)_{13} - (PRR_2)_{13}$ is increased above its preceding value. The winch 16 will be regulated in opposite direction, by reducing the difference $$(PRV_1)_{16} - (PRR_2)_{16}$$

down to a value which is at most equal to that of the difference $(PRR_1)_{16} - (PRV_2)_{16}$ at the moment when the drift of the installation N has been stopped.

The reutrn force toward O' will then be:

$$(T_{E_1} - T_{D_4}) - Fx$$

Similarly if the force F has a component Fy along the axis Oy which tends to move O by $\Delta y$ with unwinding of the moorings 2 and 3, the device according to the invention will automatically increase the tensions $T_{D_2}$, $T_{D_3}$ by simultaneously increasing the calibrating pressures of $(RV_1)_{14}$ and $(RV_1)_{15}$, at least as soon as the component $\Delta y$ along the axis Oy of the drift of the installation from its reference position will become greater than a chosen limit.

The device of the invention may equally be adapted to automatically decrease the tensions $T_{E_5}$ and $T_{E_6}$ of the moorings 5 and 6 in response to a drift of the installation from its reference position having the component $\Delta y$ along the axis Oy.

The means for measuring the displacements of N may for example comprise one or more tiltmeters or inclinometers of the type using a taut wire which has respective fixed points on N and the water bottom (to a mooring mass) and is adapted to measure, by two electric signals, the projections on two rectangular vertical planes (passing for example through Ox and Oy) of the inclination of this taut wire with respect to the vertical.

These measuring means may also be systems for determining the position of the installation N with respect to ranging or beaconing units receiving acoustic waves emitted into the water from N, these units emitting in turn radio response signals which are received on the installation.

If a limited deviation of the floating installation from its reference position can be accepted, the measuring means may be constituted by means for detecting the rotation of the winches in either direction, such a rotation occurring, as already indicated, only when the variation in tension of the mooring rope reeled on the winch becomes higher than that which can be absorbed by the elasticity of the rope and/or compensated by a modification of its profile of equilibrium.

It will also be possible to use a gyroscopic compass indicating the deviation $\Delta\theta$ of the heading of N with respect to a reference heading representated by the vector OD (FIG. 2).

The measuring means will deliver signals the value of which is a function of the measured drift or deviation of N from the reference position and for example proportional to said drift.

The signal may be constituted by a variable number of elementary signals having a constant amplitude (this number being the value of the signal) or formed by only one signal the intensity of which represents the value of the measured drift or deviation.

A form of embodiment of means for regulating the tension applied by the winch 13 is schematically illustrated by FIG. 4.

In this illustrative embodiment, the regulating means simultaneously adjust the value of the tension at which the mooring rope 1 is unwound (by regulating the calibrating pressure $(PRV_1)_{13}$ of the valve $(RV_1)_{13}$) and the value of the tension at which the rope is wound up by the winch 13 (by simultaneously regulating the calibrating pressure $(PRR_1)_{13}$ of the valve $(PR_1)_{13}$). Under these conditions any increase in the unwinding tension of the winch 13, automatically realized by the device of the invention, in response to the deviation $\Delta x$ shown by FIG. 2, will be accompanied by a corresponding increase in the winding tension of this winch.

This makes it possible not only to stop the movement of N away from its reference position under the action of the component Fx of the force, but also, by exerting a sufficient winding tension on the mooring rope 1, to realize the return of N to its initial position, even in a form of embodiment of this invention adapted to associate to a displacement $\Delta x$ an adjustment of the tension of only one of the opposed moorings 1 and 4, which is selected according to the sign of $\Delta x$, i.e. according to the direction of the displacement.

In the embodiment illustrated by FIG. 4, the means for regulating the tension of the mooring rope 1 comprise two piston rods 46, 47 bearing on respective springs 39 and 43 at the upper end thereof.

The displacements of the pistons can be controlled in synchronism, by simultaneous adjustment of the calibrating pressures $(PRR_1)_{13}$ and $(PRV_1)_{13}$ through mechanical adjusting means such as the system of gears shown by FIG. 4, comprising two gear wheels in mesh with endless screws formed by the upper parts of the rods 46 and 47 respectively, these gear wheels having a common shaft 50 which can be rotated by a crank 51.

This crank is actuated by control means indicated by the general notation C and constituted in this embodiment by the association of the piston 52, connected to the crank by a system of linked rods, of the cylinder 53, wherein the piston 52 can slide and of the solenoid-operated valve 54. This valve controls the admission of hydraulic fluid under pressure to one or the other side of the piston 52, according to which one of the inputs (55a or 55b) of the valve the electric control signal is applied to, i.e. according to the sign of this signal (diodes $D_1$ and $D_2$, FIG. 4). The application of a control signal to the input terminals 55c of the control means is thus followed, according to the sign of this signal, by an increase or by a decrease in the tension applied by the winch 13 to the mooring rope 1, as a result of axial displacements of the rods 46 and 47 increasing or decreasing the compression of the springs 39 and 43 respectively, thus controlling the calibrating pressures $(PRR_1)_{13}$ and $(PRV_1)_{13}$.

FIG. 5 diagrammatically illustrates an embodiment of an automatic device according to the invention corresponding to the arrangement of the winches and moorings shown by FIGS. 1 and 2.

Means for generating control signals, indicated by 56 and 57 (some embodiments thereof will be described hereinafter with reference to FIGURES 6 and 7) are adapted, in this form of, embodiment to deliver the control signals X and Y respectively, in response to deviation signals substantially proportional to $\Delta x$ and $\Delta y$ respectively, which are supplied by position measuring means, and to deliver the control signal $\Theta$ in response to a deviation signal proportional to $\Delta\theta$ supplied by a device for measuring the heading, $\Delta x$, $\Delta y$ and $\Delta\theta$ having the already indicated respective significations.

The control signals X, Y and $\Theta$ are assumed to be electrical voltages, positive, negative or equal to zero.

The control signal X is applied through the amplifiers A and A″ to the devices $C_1$ and $C_4$ controlling the means for regulating the tensions of the moorings 1 and 4 wound on the winches 13 to 16 respectively. These control devices may be, for example, similar to the control means C of FIG. 4, being adapted to cause opposed variations in the respective tensions of the moorings 1 and 4 in response to one and the same control signal.

The control signals Y and Θ are algebraically added in the way shown by FIG. 5 by means of operational amplifiers connected to the respective inputs of the control means $C_2$, $C_3$, $C_5$ and $C_6$ which respectively control the means for regulating the tensions of the ropes 2, 3, 5 and 6.

These control means may, for example, be all similar to the control means C illustrated by FIG. 4.

The means 56 and 57 for generating control signals actuated by the deviation signals delivered by the means for measuring the position of the installation may be adapted to deliver a control signal exclusively if the deviation of the installation from its reference position (which deviation may be represented by its components $\Delta x$, $\Delta y$, $\Delta \theta$) becomes higher than a plus limiting deviation.

These means for generating control signals may be of a type producing a control signal the value of which always varies as that of the corresponding deviation signal, the control signals X, Y, Θ being, for example, substantially proportional to the deviations $\Delta x$, $\Delta y$ and $\Delta \theta$ respectively.

In such a case the means for generating control signals may simply be amplifiers connected to the respective outputs of the means for measuring the position.

Such an embodiment will, for example, be obtained by placing in 56, in the diagram of FIG. 5, a measuring device, such as a tiltmeter or inclinometer, delivering two output signals X and Y which are functions of the deviations $\Delta x$ and $\Delta y$ and by placing in 58 in the same diagram a heading measuring device, such as a gyroscopic compass or gyrocompass delivering a signal Θ which is a function of $\Delta \theta$.

This embodiment has however a drawback in that it only permits the stopping or limiting of a drift or displacement of the installation N occurring under the action of an external disturbing force (wind, current, etc.) without return of N to its initial position as long as the disturbing force remains, since there is a control signal X (or Y, or Θ), and thus an adjustment of the tension opposing the action of the disturbing force, exclusively for $\Delta x$ (or $\Delta y$ or $\Delta \theta$) different from zero, i.e. outside the reference position.

According to a preferred embodiment of the device in accordance with the invention, the means for generating control signals are adapted, upon receipt of suitable control signals, to cause a progressive variation in the tension of at least one mooring rope, in the sense tending to bring the installation to its reference position and adapted to stop said variation only when the latter has reached an absolute value which is higher than the one for which the speed of displacement or drift of the installation is reduced to zero. This embodiment will permit, in the considered case of a displacement or drift of N under the action of an external force, a continuation of the automatic variation of tension withstanding the displacement to at least the point where the absolute value or amplitude of this variation has become higher than the value which is sufficient to stop the drift of N. This makes it possible to reverse the direction of displacement and to bring or to bring back the floating installation to its reference position against the action of the external force.

Two nonlimiting embodiments of this preferred form of realization are illustrated by FIGS. 6 and 7, where only the means for generating a control signal X corresponding to a deviation $\Delta x$ have been shown (the means for generating control signals Y and Θ may be realized in absolutely analogous manner).

In the embodiment according to FIGURE 6, the measuring means, constituted for example by a tiltmeter, deliver signals $\Delta x$ and $\Delta y$ which are respective functions of the components along two coordinate axes Ox, Oy of the deviation between the position of N and a reference position the coordinates of which are adjustable at will through potentiometric means.

The deviation signal $\Delta x$ is applied to comparing means 59 which may be constituted by any electronic comparator adapted to deliver an electric signal which, after amplification through an amplifier 64, gives a control signal X exclusively when the absolute value of the deviation signal $\Delta x$ is greater than the absolute value of a reference deviation $\Delta x_0$ representing the maximum deviation admitted for the position of N in projection on the axis Ox ($\Delta x_0$ can be adjusted to the chosen value by potentiometric means and can eventually be equal to zero). The signal X will be positive or negative according to the sign of $\Delta x$. This signal may be used as a control signal for the device illustrated by FIG. 5, being applied to the control means of FIG. 4.

The control signal will produce a variation in the tension of the mooring rope 1 in the direction tending to bring the installation N back to its reference position, by admission of hydraulic fluid under pressure to one side of the piston 52 and this variation will continue as long as there exists a control signal X, i.e., as long as the absolute value of the deviation signal $\Delta x$ does not become smaller than $\Delta x_0$. In the absence of any control signal X, the position of the piston 52 and hence the tension of the rope 1 will remain constant.

Switching means for intermittent electric connection may be provided between the measuring means 58 and the control means C, such switching means being indicated in dotted lines on FIG. 6 and comprising a switch, the successive opening and closure of which is periodically controlled by a clockwork or any other suitable electronic means indicated by 60. The switch also preferably comprises means for regulating the switching frequency (these last means being indicated by the arrow 65).

The above structure will provide a variation, step by step, in the tension of the mooring rope until the absolute value of the deviation signal $\Delta x$ becomes less than $\Delta x_0$, this last value being adjustable.

In such a form of embodiment the signals emanating from the comparating means 59 will have the form of square waves the length of which is a function of the duration of closure of the switch. It will be convenient to connect, at the output of the amplifier 64, a known device for shaping these signals, giving them a well defined and adjustable length, this device being, for example, a monostable multivibrator.

The embodiment shown by FIG. 7 of the means for generating control signal differs from the preceding one in that it comprises means for differentiating the deviation signal $\Delta x$, such means consisting for example of a differentiating-amplifier 62 of a classical type and in that it comprises a known logical element 63 or gate "AND" which exclusively delivers a signal when the signal emanating from the comparator 59 and the signal $dx/dt$ at the output of the differential-amplifier 62 have the same sign, i.e., when the components along the axis Ox of the drift of the installation N from its reference position and of the speed of displacement of this installation have the same sign.

The signal emanating from 63 produces, after amplification in 67 the control signal X. Under these conditions, 67 as long as the installation N moves in the direction which increases its distance to the reference position, the control means C will remain actuated by the control signal X so as to oppose the drift of the installation with a progressive variation in the tension of the mooring rope (for example a progressive increase in the tension of the rope 1, in the case of FIG. 2).

The control signal X will become equal to zero and thus the variation in the tension of the rope will be stopped when the direction of displacement of the installation has been reversed, which occurs for $dx/dt=0$.

Means can be used to introduce a delay before the attenuation of X, i.e., before stopping the adjustment of tension in the mooring rope, after the instant when the direction of movement of N is reversed, so as to allow for a return of N toward its reference position.

Another way for causing the return of N to its reference position consists, after the attenuation of X corresponding to the inversion of sign of $dx/dt$, in applying, through any known suitable device, at least one control pulse to the control means C, this pulse acting in the same sense as X, which has the effect of causing the movement of the insallation in the direction opposite to its previous direction of drift.

For the realization of the positioning device of the invention it will be advantageous to use moorings having little elasticity and an apparent weight in the water as small as possible so as to obtain a high accuracy in the positioning of the floating installation.

Moreover safety devices may be associated to each winch so as to lock its rotation in case of malfunction of the hydraulic circuit.

For example a safety device indicated by 58 on FIG. 3 and which may be of any known suitable type, will cut off, in case of pressure drop in the pipe 26, the electric supply of an electromagnetic brake 61, this supply being realized through the conductors 59 and 60 connected to the terminals of a source of electric current. The brake 61 of a type actuated by a lack of electric current will then lock the shaft 20 of the winch 13.

I claim:

1. Automatic device for positioning a floating installation, for substantial maintenance thereof in a reference position, comprising a plurality of winches fixed to the installation, a plurality of mooring ropes fixed to the water bottom and respectively wound on individual winches, said winches being of a type adapted to permanently keep said mooring ropes under substantially constant tension and being provided with regulating means for adjusting said constant tension, means for measuring the deviation of the position of said installation with respect to the reference position in the form of deviation signals, means for generating control signals responsive to said deviation signals; and means for controlling said regulating means, actuated by said control signals to limit said deviation signals.

2. Device according to claim 1, distinctive in that each winch is associated with at least one other winch to apply to the floating installation through the mooring rope corresponding to said other winch, an action opposing that of the first winch, the same control signal being applied to the means for controlling associated opposed winches, said means for controlling being adapted to associate with said control signal opposed variations in the tension of the respective mooring ropes wound on opposed winches.

3. Device according to claim 1, distinctive in that the means for generating control signals comprise means to generate reference signals of a preselected and adjustable value, said reference signals representing the maximum permissible deviation for the installation with respect to its reference position, means to compare said deviation signals and said reference signals adapted to supply a comparison signal exclusively when the difference between the respective absolute values of the deviation signal and of the corresponding reference signal is positive, and means generating a control signal in response to said comparsion signal.

4. Device according to claim 3, distinctive in that the control means are adapted, upon receipt of suitable control signals, to cause the displacement of the installation in a direction toward the reference position by progresssive variation in the tension of at least one mooring rope, this variation reaching an absolute value which is greater than the one for which the speed of displacement is reduced to zero.

5. Device according to claim 3, distinctive in that said control means are associated to said measuring means through intermittent connection means.

6. Device according to claim 1, distinctive in that said means for generating control signals are actuated by said deviation signals and adapted to deliver control signals the value of which varies in accordance with a corresponding deviation signal.

References Cited

UNITED STATES PATENTS 3,010,214   11/1961   Postlewaite _____ 114—144 XR
3,160,850   12/1964   Dudley _____ 114—144 XR ANDREW H. FARRELL, *Primary Examiner.*

U.S. Cl. X.R.

114—230